3,304,247
PREPARATION OF ISOPROPANOL-ACETYLENIC ADDITION PRODUCTS
Joseph K. Hoffman, Morristown, N.J., assignor, by mesne assignments, to Cumberland Chemical Corporation, New York, N.Y., a corporation of Delaware
No Drawing. Original application Sept. 12, 1960, Ser. No. 55,164. Divided and this application Feb. 8, 1966, Ser. No. 525,834
8 Claims. (Cl. 204—158)

This application is a division of copending application Serial No. 55,164, filed September 12, 1960, now abandoned.

This invention relates to a process for reacting acetylene and acetylenic hydrocarbons with isopropanol in the presence of a free radical initiator. It more particularly relates to methods of obtaining a variety of addition products by reacting isopropanol with acetylene and substituted acetylene derivatives, in the presence of a free radical initiator such as a peroxide or ultraviolet radiation.

Accordingly, it is the object of this invention to provide a process for obtaining 2,5-di-methylhexane-2,5-diol and 2-methyl-3-butene-2-ol by reacting under proper reaction conditions, isopropanol and acetylene in the presence of a free radical initiator.

It is also an object of this invention to provide a process for obtaining cis- and trans-2,5-dimethyl-3-hexene-2,5-diols by reacting isopropanol and 2-methyl-3-butyn-2-ol in the presence of a free radical initiator.

It is a further object of this invention to provide a general method, utilizing free radical initiators, for obtaining various condensates by reacting isopropanol and acetylene or substituted acetylene derivatives.

It is a still further object of this invention to provide methods for producing greater quantities of substantially pure, or easily purifiable, acetylenic-isopropanol condensates.

The objects of this invention are accomplished generally by reacting in an autoclave or the like, an excess of isopropanol with acetylene, preferably at a temperature of from 140° C. to 160° C. at an acetylene pressure of preferably from 20 to 50 p.s.i.g. above the vapor pressure of the isopropanol. A free radical initiator such as ultraviolet radiation, or a peroxide such as di-t-butyl peroxide, t-butyl hydroperoxide or dicumyl peroxide is added to this mixture to initiate the reaction. Depending upon the reaction conditions, varying amounts of 2,5-dimethylhexane-2,5-diol, hereinafter referred to as dimethylhexanediol, and 2-methyl-3-butene-2-ol, hereinafter referred to as methyl butenol are obtained. Pure dimethylhexanediol and methyl butenol are obtained by distilling the reaction products; the distillate portion thus obtained is redistilled, and the resulting distillate fraction, boiling at 96°–97° C. is recovered as substantially pure methyl butenol. The balance of the distillate fraction, containing peroxide and isopropanol, is recycled back to the reaction vessel in order to maximize the yield of the desirable end products. The residue, resulting from the first distillation of the reaction products, is redistilled in vacuo, and substantially pure dimethylhexanediol is recovered from the distillate.

The more general procedure for accomplishing the objects of this invention, in addition to the embodiment of these processes summarized above, entails reacting an excess of isopropanol with a substituted acetylene compound, such as dimethyl acetylene, dialkyl acetylene, phenyl acetylene, or 2-methyl-3-butyn-2-ol, hereinafter referred to as methyl butynol, in the presence of a free radical initiator.

The product resulting from the condensation of isopropanol and methyl butynol is a diol comprising cis- and trans-2,5-dimethyl-3-hexene-2,5-diol hereinafter referred to respectively as cis- and trans-dimethylhexenediol. At an autoclave temperature of 150° C., approximately equal amounts of the cis and trans isomers are obtained when a peroxide catalyst is used. The reaction conditions are otherwise approximately the same for that described above for the unsubstituted acetylene. Pure products are obtained by distillation in vacuo, then fractionally crystallizing the distillate residue to separate the cis isomer from the trans isomer.

The following examples describe in greater detail the processes of this invention.

Example 1

A 400 ml. charge of isopropanol was placed in a one liter stainless steel autoclave, whose temperature could be regulated to within 2 degrees of the temperature desired. The autoclave was heated to a temperature of 150° C.; and approximately 10–15 ml. of di-t-butyl peroxide was forced into the reactor under acetylene pressure. Acetylene was fed into the autoclave continuously through a gas burette at a pre-selected constant pressure. During the course of the run the acetylene pressure was adjusted to 40 p.s.i.g. above the isopropanol pressure. Thus, since the vapor pressure of the isopropanol at 150° C. is 85 p.s.i.g., the total pressure of the reactants was maintained at a constant 125 p.s.i.g. Reaction was allowed to proceed for about 2½ hours. The autoclave was then cooled rapidly to room temperature and the unreacted acetylene vented through a wet test meter.

The liquid product removed from the autoclave was distilled in a fractionation column. A pre-cut was taken which consisted of the balance of the undecomposed peroxide and any acetone which may have been formed by the decomposed peroxide. The di-t-butyl peroxide forms an azeotrope with isopropanol boiling at about 76° C. and consisting of 15–20% peroxide. The balance of the methyl butenol was then removed with little difficulty. The distillation residue which contained the diol was distilled at 2 mm. and at a pot temperature of 90–150° C. in order to remove the diol. The isopropanol-peroxide azeotrope was recycled back to the autoclave for further reaction.

The diol yield was about 76% based on acetylene and about 90% based on isopropanol. This represented about a 10% solution of diol in isopropanol.

Example 2

In order to produce substantially pure methyl butenol, the same procedure was followed as described above in Example 1, with the exception that the reactants were heated at a temperature of 150° C. for 5 minutes. The acetylene pressure was kept at a constant 20 p.s.i.g. above the vapor pressure of the isopropanol at 150° C., throughout the run.

The product thus obtained was distilled in a fractionation column at about 76° C. After a pre-cut was taken, eliminating the isopropanol-peroxide azeotrope from the distillate, the balance of the isopropanol and methyl butenol were removed with little fractionation. This resulting distillate solution was carefully redistilled. The first distillate portion, boiling at about 81° C.–82° C. was isopropanol; the second distillate portion, boiling at about 97° C. contained substantially pure methyl butenol.

The overall yield based on acetylene was slightly over 77% while that based on isopropanol was 90%.

Example 3

In a stainless steel autoclave 550 ml. of isopropanol, 40 gms. of methyl butynol and 16 gms. of di-t-butyl peroxide were mixed. The autoclave was flushed three times with nitrogen, heated to 150° C., and maintained at that temperature for about one hour, after which time the autoclave was rapidly cooled to room temperature. The reaction products were placed in a distillation apparatus similar to that used in Examples 1 and 2, where the isopropanol and undecomposed peroxide were removed rapidly at atmospheric pressure. Any unreacted methyl butynol was also carried over with this fraction. The distilling pressure was then lowered to 2 mm. and the diols were distilled over at a pot temperature of 90–150° C.

The cis and trans isomers of the principal product, dimethyl hexenediol, were separated by taking the crystalline product up in hot benzene and allowing the solution to cool. The trans isomer separated first. Upon evaporation of the benzene, the cis form was obtained. This method affords a fairly good separation of the isomer.

The crude trans isomer obtained from the initial benzene separation was recrystallized four times from petroleum ether to give a material melting at 95°–96° C. The crude cis isomer was recrystallized several times from petroleum ether to obtain a compound melting at 71.5°–72.5° C.

A yield of 90% diols, based on methyl butynol, was obtained in this one hour run at 150° C. As in Example 1, the undecomposed di-t-butyl peroxide left over after the run may be recovered as it distills azeotropically with the excess isopropanol.

*Example 4*

A reaction vessel was prepared, utilizing a Pyrex reactor resembling an enlarged test tube, and inserting therein a Vycor water jacket, through which water circulated. A 450 watt mercury vapor lamp was inserted into the interior recess of the Vycor water jacket. A charge of 963 ml. isopropanol and 88 ml. acetone was placed in the Pyrex reactor. The acetone acts as an ultraviolet absorber, decomposing on exposure to ultraviolet radiation, thus initiating and accelerating the reaction. Acetone is one among many compounds known as photosensitizers.

Acetylene gas was bubbled into the reactor at the rate of 0.5 liter/min. The 450 watt mercury lamp was turned on, and the reaction allowed to proceed for 3 hours. The ambient temperature was 28° C.

At the conclusion of the run, the products were analyzed. Thirty grams of dimethylhexanediol and 21 grams of methyl butenol were obtained.

*Example 5*

Into the reaction vessel described in Example 4 a charge of 915 ml. of isopropanol, 67 gms. of methyl butynol and 84 ml. acetone was placed. The reactor was heated to 60° C., the 450 watt mercury vapor lamp turned on, and the reaction allowed to proceed for three hours. A yield of 92% cis- and trans-dimethylhexenediols, based upon methyl butynol was obtained. The ratio of cis and trans isomer products by photoinitiation is about 10 to 1 compared with the ratio of the peroxide initiated reaction of Example 3, which was found to be 1 to 1.

The principal reactants used in the processes of this invention are isopropanol and acetylene, although a substituted acetylene derivative, such as methyl butynol, phenyl acetylene, dimethyl acetylene and dialkyl acetylene may also be used. The catalyst is extremely important in this invention, and is required to produce the desired addition reaction. A good free radical initiating catalyst should be selected, such as di-t-butyl peroxide. Tertiary-butyl hydroperoxide and dicumyl peroxide are somwhat less efficient than di-t-butyl peroxide, but may nevertheless be used to produce substantial amounts of acetylene condensates. Ultraviolet radiation has also been found to be quite as effective as di-t-butyl peroxide in promoting the desired condensation reaction, when photosensitizers such as acetone, are present.

At the temperature of the reaction, the peroxide catalyst decomposes into free radicals which generate, in turn, isopropanol free radicals. The latter then add to the acetylene. The first addition produces methyl butenol. This upon further reaction with isopropanol free radicals produces dimethylhexanediol. A by-product of the reaction is a low molecular weight polymer of acetylene, known as a telomer whose formation is also initiated by the isopropanol free radicals.

The reaction between isopropanol and a substituted acetylene derivative proceeds in an analogous fashion yielding condensate products and a telomer or telomers of substituted acetylene.

The amount of peroxide catalyst added to the reactants discussed above should be at least 0.0025 part by volume of the catalyst per part by volume of isopropanol. In the acetylene-isopropanol reaction, increasing the concentration of peroxide catalyst favors formation of methyl butenol, the first addition product, at the expense of the diol. The influence of this variable, i.e., the effect of the quantity of peroxide in the reaction, is not as important as the other variables to be discussed however, such as temperature and pressure.

As indicated in Examples 4 and 5, when ultraviolet radiation was used as the free radical initiator, the source thereof was a 450 watt mercury vapor lamp. Any similar source is permissible, generating radiation of sufficient energy to carry out the reaction. The amount of ultraviolet radiation photosensitizing agent required is not really critical, although about 0.08 part of the agent per part by volume of the isopropanol appears to be optimum. Other photosensitizers, in addition to acetone, which is probably the least expensive, may be employed. A listing of various photosensitizers may be found in Steacie, E. W. R., "Atomic and Free Radical Reactions," second edition, vol. I, 1954, Reinhold Publishing Corp., New York, N.Y.

In the addition of acetylene to isopropanol, pressures of from 1 to 240 p.s.i.g. above the vapor pressure of isopropanol at the selected reaction temperature, are effective in producing the desired end products. Actually, as long as some acetylene is present in the reaction vessel, the addition reaction will occur. Hence, the lower limit is about 1 p.s.i.g. The upper limit is also approximate and is determined by what may be considered to be, under the circumstances, a safe operating pressure. Total reaction pressures in excess of 300 p.s.i.g. present definite safety problems.

Generally, increasing the acetylene pressure increases the speed of the reaction, whether a peroxide catalyst or ultraviolet radiation are used as initiators. However, increasing the pressure also favors formation of the acetylene telomer. Thus, if one desires mostly methyl butenol and dimethylhexanediol, a pressure range of 20 to 50 p.s.i.g. above the vapor pressure of isopropanol is preferable.

Production of methyl butenol is favored by lower pressures, and if a greater amount of this substance is desired, the optimum pressure is about 20 p.s.i.g. above the vapor pressure of isopropanol. On the other hand, higher pressures favor diol production, and should the diol be the desired end product, the optimum acetylene pressure is 40 p.s.i.g. above the vapor pressure of isopropanol at 150° C.

As indicated above, the quantity of peroxide catalyst present in the reaction vessel affects the speed and extent of the reaction. The effectiveness of the catalyst is also dependent upon the reaction temperature as well, since the number of free radicals produced per unit time is determinative of its effectiveness. It is well to note that the efficiency of the catalyst, in terms of moles of useful product per mole of peroxide is dependent upon the acetylene pressure to a certain extent.

In carrying out the other embodiments of the processes of this invention, in which substituted acetylene derivatives are employed in conjunction with isopropanol, up to 1 part by volume of acetylene derivative is mixed with 10 parts by volume of isopropanol in the reaction vessel. This is about the preferable ratio. An increase in the amount of acetylene derivative does not yield appreciably more addition product.

Thus, in the addition of methyl butynol to isopropanol to form cis and trans isomers of dimethylhexenediol, about 1 part by volume of methyl butynol is mixed with 10 parts by volume of isopropanol. This represents a weight ratio of slightly over 10 to 1. Increasing the amount of isopropanol as well as the amount of peroxide catalyst above the quantities of those constituents noted above does not materially result in an increase in the quantity of addition products.

On a weight ratio basis, for every part of substituted acetylene derivative used, from 2 to 12 parts of isopropanol should be used. The optimum ratio will vary from case to case depending upon the type of acetylene derivative.

A temperature range of 100° C. to 200° C. is permissible for carrying out the processes of this invention when utilizing a peroxide catalyst. Temperatures in excess of 200° C. favor the formation of a resinous material, probably highly polymerized telomer, at the expense of the desired addition product. Moreover, virtually no desirable addition product is found when the reaction is carried out above 200° C. The lower temperature limit is approximate. Below this limit, the reactions proceed extremely slowly, and very little addition product is obtained within the reaction period. Higher temperatures, within the permissible range, favor production of methyl butynol over the diol, when isopropanol and acetylene are reacted.

The preferred temperature range is from 140° C. to 160° C. when using a peroxide catalyst. It is within this range that the best yields of addition product are obtained for a given reaction time.

The processes of this invention may also be carried out by using ultraviolet radiation. In this case, the reactants at room temperature will yield a satisfactory quantity of addition product with a reasonable time, as indicated in Example 4. Temperatures of as low as 0° C. and up to 200° C. are also permissible, but at 60°–80° C., optimum results are obtained.

The length of time required for production of isopropanol-acetylene condensates depends upon the parameters of temperature, pressure and quantity of catalyst. Generally, a time range of from 2 minutes to six hours is required. In the primary embodiment of this invention, the process for reacting acetylene and isopropanol, a longer time, about 2 to 5 hours, is required to produce dimethylhexanediol. On the other hand, a reaction time of only 5 minutes is required to produce the first addition product, methyl butynol.

Generally, when using ultraviolet radiation as the free radical initiator, a reaction time of about at least one hour is required. The reaction rate in the optimum temperature range of 60°–80° C. is 25% greater than at room temperature.

Irrespective of the reaction conditions, a variety of reaction products is invariably present in the crude reaction mixture at the end of a run. Methyl butynol and dimethylhexanediol are present in varying proportions at the end of the addition reaction of isopropanol and acetylene. Some telomer is also present, as well as decomposed and undecomposed peroxide, and excess isopropanol. The undecomposed di-t-butyl peroxide forms an azeotrope with isopropanol, boiling at 76° C., and is easily removed from the reaction mixture. This is another reason for using this catalyst, in addition to its being the most effective promoter of the reactions.

The unused isopropanol and methyl butynol may be removed from the reaction product mixture with ease, by a simple distillation operation, if only diol is desired. In order to increase diol yield, the isopropanol-methyl butenol distillate thus obtained, should be recycled back to the reaction vessel for further conversion to diol. Diol is easily recovered from the residue remaining after removal of the volatile components, by vacuum distillation.

If methyl butynol alone is desired, the reaction product mixture is fractionated to remove the peroxide azeotrope; then again carefully fractionated to separate the methyl butynol boiling at 96° C.–97° C. from the isopropanol, boiling at 81° C.–82° C.

Similar separation procedures are followed for the reaction products of isopropanol and substituted acetylene derivatives. For example, in the reaction of isopropanol and methyl butynol, the di-t-butyl peroxide azeotrope is removed rapidly at atmospheric pressure at about 76° C. Unreacted methyl butynol is also carried away with this fraction. The distillation pressure is then considerably reduced, and the cis- and trans-dimethylhexenediol is distilled over at a pot temperature from 90° C.–150° C. The telomer and/or resinous material remain in the residue. Example 3 indicates how the cis and trans isomers may be separated by fractional crystallization. Naturally, similar procedures are employed, wherever possible, in order to separate intermixed solid reaction products.

I claim:
1. A process for preparing isopropanol-acetylenic addition products which comprises reacting isopropanol with an acetylenic compound selected from the group consisting of acetylene, dialkyl acetylene, phenyl acetylene and 2-methyl-3-butyn-2-ol at a temperature of from about 30° C. to about 80° C., for about 1 to 5 hours, in the presence of an ultraviolet radiation photosensitizer, exposing the reaction mixture to ultraviolet radiation to produce a reaction product mixture containing addition products of isopropanol and said acetylenic compound and removing said unreacted products from said product mixture.

2. A process which comprises reacting isopropanol and an acetylenic compound selected from the group consisting of acetylene, dialkyl acetylene, phenyl acetylene and acetylenic mono-hydroxy alcohol at a temperature of from about 60 to about 80° C., for about 1 to 5 hours, in the presence of an ultraviolet radiation photosensitizer while exposing said isopropanol and said acetylenic compound to ultraviolet radiation.

3. A process which comprises reacting isopropanol and acetylene at a temperature of from about 60 to about 80° C., for about 1 to 5 hours, in the presence of an ultraviolet radiation photosensitizer while exposing said isopropanol and said acetylene to ultraviolet radiation.

4. A process as defined in claim 2, wherein said photosensitizer is acetone.

5. A process which comprises reacting isopropanol and an acetylenic mono-hydroxy alcohol at a temperature of from about 60 to about 80° C., for about 1 to 5 hours, in the presence of acetone while exposing said isopropanol and said acetylenic alcohol to ultraviolet radiation.

6. A process as defined in claim 1, wherein said photosensitizer is acetone.

7. A process as defined in claim 1, wherein said acetylenic compound is 2-methyl-3-butyn-2-ol.

8. A process as defined in claim 5, wherein said acetylenic alcohol is 2-methyl-3-butyn-2-ol.

References Cited by the Examiner

Urry: Journal of American Chemical Society, vol. 75 (January 5, 1953), pp. 250–251.

JOHN H. MACK, *Primary Examiner.*

HOWARD S. WILLIAMS, *Examiner.*